US005773125A

United States Patent [19]

Hashimoto et al.

[11] Patent Number: 5,773,125

[45] Date of Patent: Jun. 30, 1998

[54] SYNDIOTACTIC STYRENIC POLYMER FILM, PROCESS FOR THE PREPARATION OF THE SAME AND PHOTOGRAPHIC MATERIAL

[75] Inventors: Kiyokazu Hashimoto; Hiroshi Kawasaki, both of Kanagawa, Japan

[73] Assignee: Fuji Photo Film Co., Ltd., Kanagawa, Japan

[21] Appl. No.: 575,501

[22] Filed: Dec. 20, 1995

[30] Foreign Application Priority Data

Dec. 20, 1994 [JP] Japan .................................... 6-316740
Jan. 20, 1995 [JP] Japan .................................... 7-007344

[51] Int. Cl.$^6$ ........................................................ B32B 3/10

[52] U.S. Cl. .......................... 428/141; 428/142; 428/148; 428/195; 428/199; 428/205; 428/213; 428/215; 428/477.7; 428/474.4; 428/476.3; 428/522; 428/913; 430/523; 430/531; 430/532; 430/536; 430/271; 427/40; 427/44; 427/54.1

[58] Field of Search .................................... 428/913, 522, 428/141, 142, 148, 195, 199, 205, 213, 215, 477.7, 474.4, 476.3; 430/523, 531, 532, 536, 271; 427/40, 44, 54.1

[56] References Cited

U.S. PATENT DOCUMENTS 5,188,930 2/1993 Funaki .................................... 430/536

*Primary Examiner*—Leszek Kiliman
*Attorney, Agent, or Firm*—Birch, Stewart, Kolasch & Birch, LLP

[57] ABSTRACT

A syndiotactic styrenic polymer film has a coated layer. The film has a height of waviness of not higher than 18 mm. A process for the preparation of the same is also disclosed. A silver halide photographic material having the syndiotactic styrenic polymer film as a support is further disclosed.

19 Claims, 1 Drawing Sheet

SYNDIOTACTIC STYRENIC POLYMER FILM, PROCESS FOR THE PREPARATION OF THE SAME AND PHOTOGRAPHIC MATERIAL

FIELD OF THE INVENTION

The present invention relates to a syndiotactic styrenic polymer film having a coated layer. The invention also relates to a process for the preparation of the same and a silver halide photographic material having the syndiotactic styrenic polymer film as a support.

BACKGROUND OF THE INVENTION

A silver halide photographic material usually has a problem about dimensional stability. The dimension changes according to the change of temperature or humidity, particularly to the change of humidity. The dimensional change is a serious problem, particularly when the photographic material is used for the preparation of a printing plate, which should reproduce a dot image for a multicolor print or a minute line art.

The dimensional change is due to the changes of protective colloidal layers (including silver halide emulsion layers) and a support. Accordingly, the colloidal layers and the support should be improved to obtain a high dimensional stability.

However, the improvement of the conventional polyethylene terephthalate support about the dimensional stability almost reaches the technical limit. Therefore, a new plastic support should be developed to obtain such a high dimensional stability.

Japanese Patent Provisional Publication No. 3(1991)-131843 (corresponding to U.S. Pat. No. 5,188,930 and European Patent Application No. 0423712A1) discloses a photographic film containing a syndiotactic styrenic polymer, which can be used as a support of a photographic material. The syndiotactic styrenic polymer film has an excellent dimensional stability to varying humidity. The stability of the syndiotactic styrenic polymer film is much larger than (about ten times) the stability of a polyethylene terephthalate polymer film.

SUMMARY OF THE INVENTION

However, the applicants have noted some problems when the syndiotactic styrene polymer film is used as the support of a photographic material for a printing plate. The photographic material comprises an undercoating layer and silver halide emulsion layers on one side of the syndiotactic styrene polymer support and backing layers on the other side of the support. The photographic material for a printing plate is laminated on a test chart, and the lamination is exposed to light. As a result, the obtained image is distorted. The distortion of the image obtained by using the syndiotactic styrene polymer support is more serious than that of the image obtained by using a polyethylene terephthalate support, though the dimensional stability of the syndiotactic styrene polymer film is superior to that of the polyethylene terephthalate polymer film. Further, the image obtained by using the syndiotactic styrene polymer support does not have a sufficient sharpness.

According to study of the applicants, the problems are caused while coating a layer (an undercoating layer or a backing layer) on the syndiotactic styrene polymer film.

An object of the present invention is to provide a syndiotactic styrenic polymer film having a coated layer improved in the dimensional stability.

Another object of the invention is to provide a process for the preparation of a syndiotactic styrenic polymer film having a coated layer improved in the dimensional stability.

A further object of the invention is to provide a silver halide photographic material that can form a clear sharp image, which is not distorted.

The present invention provides a syndiotactic styrenic polymer film having a coated layer, wherein the film has a height of waviness of not higher than 18 mm.

The invention also provides a process for the preparation of a syndiotactic styrenic polymer film having a coated layer, said film having a height of waviness of not higher than 18 mm, wherein the process comprises the steps of:

coating a coating solution of the layer on the syndiotactic styrenic polymer film; and drying the film at 50° to 200° C. while conveying the film on rollers, said rollers being arranged at a distance in the range of 0.1 to 10 m.

The present invention further provides a silver halide photographic material which comprises an undercoating layer and/or a backing layer and at least one silver halide emulsion layer provided on a syndiotactic styrenic polymer film support, said undercoating layer and said silver halide emulsion layer being arranged on one side of the support, and said backing layer being arrange on the other side of the support, wherein the film has a height of waviness of not higher than 18 mm.

DETAILED DESCRIPTION OF THE INVENTION

Height of Waviness

The syndiotactic styrenic polymer film having a coated layer has a height of waviness of not higher than 18 mm according to the present invention.

The applicants note that the dimensional stability of the syndiotactic styrenic polymer film is low at a high temperature (higher than the glass transition temperature), compared with a polyethylene terephthalate polymer film. The glass transition temperature of the syndiotactic styrenic polymer is about 100° C. A coated layer (an under-coating layer or a backing layer) is usually dried at a high temperature (110° to 200° C.). Therefore, waviness of higher than 18 mm are formed on the known syndiotactic styrene polymer films after the films are heated at the drying temperature.

The formed waviness degrades the dimensional stability of the film having the coated layer to distort the image obtained by using the syndiotactic styrene polymer support.

The applicants now solve the problems by decreasing the height of waviness to not higher than 18 mm. The height of waviness preferably is not higher than 12 mm, more preferably is not higher than 6 mm, further preferably is not higher than 5 mm, and most preferably is not higher than 4 mm.

Figure 1:
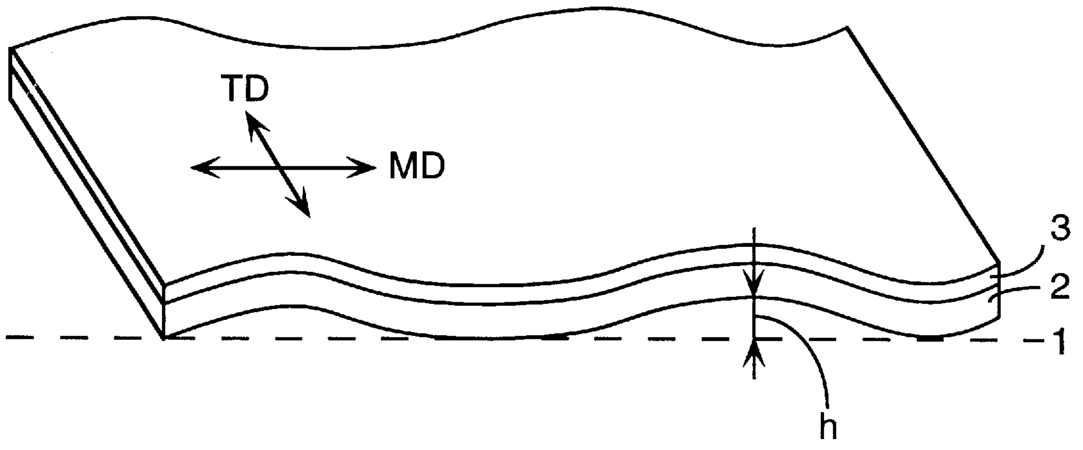
FIG. 1 is a sectional view schematically illustrating the measurement of the height of waviness of a syndiotactic styrenic polymer film having a coated layer.

The height of the waviness can easily be measured. The measurement is described by referring to FIG. 1. FIG. 1 is a sectional view schematically illustrating the measurement of the height of waviness of a syndiotactic styrenic polymer film having a coated layer.

The film of the present invention is placed on a flat place as a base line (1). The film comprises a syndiotactic styrenic polymer film (2) and an undercoating layer (3). The wave is usually caused along the longitudinal or machine direction (MD shown in FIG. 1). Accordingly, the film is observed from the latitudinal or transverse direction (TD shown in FIG. 1). The height of the waviness (h) means the maximum distance between the base line (1) and the film (2).

The height of waviness can be decreased by (A) improving the physical characteristics of the film itself or by (B) improving the drying process after the coated layer is formed. The methods of improvements (A) and (B) are described below in more detail.

Syndiotactic Styrenic Polymer

The polymer film of the present invention comprises a syndiotactic styrenic polymer.

In the present specification, the styrenic polymer means polystyrene, polymers of styrene derivatives and copolymers thereof.

Examples of the styrene derivatives include alkylstyrenes, arylstyrenes, alkenylstyrenes, halogenated styrenes, halogenated alkylstyrenes and alkoxystyrenes. Examples of the alkylstyrenes include methylstyrene, ethylstyrene, propylstyrene and butylstyrene. An example of the arylstyrene is phenylstyrene. An example of the alkenylstyrene is vinylstyrene. Examples of the halogenated styrenes include chlorostyrene, bromostyrene and fluorostyrene. Examples of the alkoxystyrenes include methoxystyrene and ethoxystyrene. The styrene derivatives further include compounds formed by condensing the benzene ring of styrene with another aromatic ring. Examples of such compounds include vinylnaphthalene and acenaphthylene. The styrene derivatives furthermore include hydrogenated styrenes (e.g., vinylcyclohexane). Preferred monomers for the styrenic polymers include styrene, alkylstyrenes (e.g., p-methylstyrene, m-methylstyrene, p-tert-butylstyrene), hydrogenated styrenes and halogenated styrenes (e.g., p-chlorostyrene, m-chlorostyrene, p-fluorostyrene). Styrene and alkylstyrenes (particularly p-methylstyrene) are more preferred.

The styrenic polymer consists of a main chain (comprising carbon to carbon bond) and a side chain (phenyl or its derivative). The carbon atom of the main chain to which the side chain is attached is asymmetric carbon. The syndiotactic styrenic polymer has a regular configuration that the asymmetric carbon atoms are arranged almost alternatively in opposite directions.

The streogerularity (tacticity) can be most precisely determined by a nuclear magnetic resonance method using carbon isotope ($^{13}$C-NMR). The tacticity measured by the $^{13}$C-NMR method is indicated by the number of continuous structural (repeating) units. For example, a diad means two continuous structural units, a triad means three continuous three units, and a pentad means five continuous units.

The syndiotactic styrenic polymer of the present invention generally has such a tacticity that the content of a racemic diad is 75 to 100% (preferably 85 to 100%). The racemic diad means that two asymmetric carbon atoms are arranged alternatively in opposite directions in two continuous structural units. The syndiotactic styrenic polymer preferably has such a tacticity that the content of a racemic pentad is 30 to 100% (preferably 50 to 100%).

The syndiotactic styrenic polymer is preferably in the form of a copolymer. The combinations of two monomers for the copolymer include the following (1), (2), (3) and (4). The combinations of three or more monomers for the copolymer can be obtained by further combining the following (1) to (4).

(1) Styrene and styrene derivative (2) Styrene and another vinyl monomer (3) Styrene derivative and another styrene derivative (4) Styrene derivative and another vinyl monomer The combinations (1) and (2) are preferred. The combination (1) is most preferred.

The styrene moiety and the styrene derivative moieties in the copolymers have the syndiotactic structure. The whole structure of the copolymer preferably is syndiotactic.

The ratio of styrene unit in the copolymer is preferably in the range of 70 to 99.5 wt. %, more preferably in the range of 80 to 99 wt. %, and most preferably in the range of 90 to 98 wt. %.

Examples of other vinyl monomers include olefin monomers (e.g., ethylene, propylene, butene, hexene, octene), diene monomers (e.g., butadiene, isoprene), cyclic olefin monomers, cyclic diene monomers, acrylic esters, methacrylic esters (e.g., methyl methacrylate), maleic anhydride and acrylonitrile.

The structure of the copolymer may be block, random or alternative.

Examples of the preferred copolymers are shown below. In the following examples, the term "syn-" means syndiotactic (structure).

| Copolymer | Units | Copolymerizing ratio (wt. %) |
|---|---|---|
| (CP-1) | Styrene/p-methylstyrene syn-copolymer | (98/2) |
| (CP-2) | Styrene/p-methylstyrene syn-copolymer | (97/3) |
| (CP-3) | Styrene/p-methylstyrene syn-copolymer | (95/5) |
| (CP-4) | Styrene/p-methylstyrene syn-copolymer | (93/7) |
| (CP-5) | Styrene/p-methylstyrene syn-copolymer | (85/15) |
| (CP-6) | Styrene/p-methylstyrene syn-copolymer | (80/20) |
| (CP-7) | Styrene/p-chlorostyrene syn-copolymer | (95/5) |
| (CP-8) | Styrene/p-chlorostyrene syn-copolymer | (93/7) |
| (CP-9) | Styrene/p-chlorostyrene syn-copolymer | (85/15) |
| (CP-10) | Styrene/p-chlorostyrene syn-copolymer | (80/20) |
| (CP-11) | Styrene/hydrogenated styrene syn-copolymer | (95/5) |
| (CP-12) | Styrene/hydrogenated styrene syn-copolymer | (93/7) |
| (CP-13) | Styrene/hydrogenated styrene syn-copolymer | (85/15) |
| (CP-14) | Styrene/hydrogenated styrene syn-copolymer | (80/20) |
| (CP-15) | Styrene/hydrogenated styrene/p-methylstyrene syn-copolymer | (90/5/5) |
| (CP-16) | Styrene/hydrogenated styrene/p-methylstyrene syn-copolymer | (86/7/7) |

In place of use of the above-mentioned copolymer, a syndiotactic styrenic polymer can be used in combination with another polymer.

The combinations of two polymers for the polymer mixture include the following (5), (6), (7) and (8). The combinations of three or more polymers for the mixture can be obtained by further combining the following (5) to (8). The combinations of copolymers can also be obtained by combining the above-mentioned copolymers (1) to (4) with the following (5) to (8).

(5) Polystyrene and another styrenic polymer (6) Polystyrene and another vinyl polymer (7) Two styrenic polymers other than polystyrene (8) Styrenic polymer other than polystyrene and another vinyl polymer The combinations (5) and (6) are preferred. The combination (8) is most preferred.

Polystyrene and styrenic polymers have the syndiotactic structure. The whole polymers contained in the mixture preferably have a syndiotactic structure.

The amount of styrene unit in the polymer mixture is preferably in the range of 70 to 99.5 wt. %, more preferably in the range of 80 to 99 wt. %, and most preferably in the range of 90 to 98 wt. %.

Examples of the preferred polymer mixtures are shown below. In the following examples, the term "syn-" means syndiotactic (structure), and the term "atc-" means atactic (structure).

| Mixture | Units | Mixing ratio (wt. %) |
|---|---|---|
| (PM-1) | Syn-polystyrene + syn-poly-p-methylstyrene | (95 + 5) |
| (PM-2) | Syn-polystyrene + syn-poly-p-methylstyrene | (93 + 7) |
| (PM-3) | Syn-polystyrene + syn-poly-p-methylstyrene | (85 + 15) |
| (PM-4) | Syn-polystyrene + syn-poly-p-methylstyrene | (80 + 20) |
| (PM-5) | Syn-polystyrene + syn-poly-p-chlorostyrene | (90 + 10) |
| (PM-6) | Syn-polystyrene + syn-poly-p-chlorostyrene | (85 + 15) |
| (PM-7) | Syn-polystyrene + syn-polyhydrogenated styrene | (90 + 10) |
| (PM-8) | Syn-polystyrene + syn-polyhydrogenated styrene | (85 + 15) |
| (PM-9) | Syn-polystyrene + atc-polystyrene | (90 + 10) |
| (PM-10) | Syn-polystyrene + atc-polystyrene | (85 + 15) |
| (PM-11) | Syn-polystyrene + atc-polystyrene + syn-poly-p-methylstyrene | (90 + 5 + 5) |
| (PM-12) | Syn-polystyrene + atc-polystyrene + syn-poly-p-methylstyrene | (86 + 7 + 7) |
| (PM-13) | Syn-polystyrene + styrene/p-methylstyrene syn-copolymer (copolymerization wt. % ratio = 95/5) | (70 + 30) |
| (PM-14) | Syn-polystyrene + styrene/p-methylstyrene syn-copolymer (copolymerization wt. % ratio = 95/5) | (60 + 40) |
| (PM-15) | Syn-polystyrene + styrene/p-methylstyrene syn-copolymer (copolymerization wt. % ratio = 95/5) | (55 + 45) |
| (PM-16) | Syn-polystyrene + styrene/p-methylstyrene syn-copolymer (copolymerization wt. % ratio = 95/5) | (50 + 50) |
| (PM-16) | Syn-polystyrene + styrene/p-methylstyrene syn-copolymer (copolymerization wt. % ratio = 90/10) | (70 + 30) |
| (PM-16) | Syn-polystyrene + styrene/p-methylstyrene syn-copolymer (copolymerization wt. % ratio = 95/5) | (60 + 40) |

The molecular weight of the styrenic polymer in terms of weight average molecular weight is preferably in the range of 100,000 to 800,000, and more preferably in the range of 200,000 to 600,000. The distribution of the molecular weight in terms of weight average molecular weight (Mw) per number average molecular weight (Mn) is preferably in the range of 1.5 to 5, and more preferably in the range of 2 to 4.

The syndiotactic styrenic polymer can be synthesized by polymerization of styrene monomer (corresponding to the styrenic polymer) in an inert hydrocarbon solvent. In the polymerization, a titanium compound and a condensate of water with a trialkylaluminum are used as catalysts, as is described in Japanese Patent Provisional Publication No. 61(1987)-187708. The synthesis can also be conducted in the absence of the solvent. A titanium compound and a compound of an anion with a cation having two or more functional group attached to one atom can also be used as catalysts, as is described in Japanese Patent Provisional Publication No. 4(1992)-249504.

Polymer Film

A plastic polymer film is formed from the syndiotactic styrenic polymer or a mixture thereof. In more detail, the syndiotactic styrenic polymer film is obtained by (1) drying the pellets of the plastic, (2) melting and extruding the pellets, (3) forming the film, (4) stretching the film, and (5) setting the film. The steps (1) to (4) are described below.

At the step (1), the pellets are heated to removed water adsorbed on the pellets. The drying process can be conducted under a reduced pressure or in the air. The drying temperature is preferably in the range of the glass transition temperature to the melting point.

At the step (2), the dried pellets are melted and extruded.

A single or double screw extruding machine having a T-die can be used. The extruding machine may have a vent. The machine preferably has a mesh filter to remove the secondary agglomerated particles or foreign particles. The temperature in the extruding machine is preferably in the range of the melting point of the polymer to the decomposition point plus 50° C.

At the step (3), the extruded melt is cooled to harden it. Examples of the cooling mediums include gas, liquid and metal rollers. An air knife, an air chamber, a touch roll or an electrostatic pinning can be used at the method of the metal rollers. A flat film can be obtained by the electrostatic pinning method.

The cooling temperature is preferably in the range of the glass transition temperature of the polymer minus 70° C. to the glass transition temperature, and more preferably in the range of the glass transition temperature minus 50° C. to the glass transition temperature minus 20° C.

At the step (4), the raw sheet is then stretched. The photographic support requires uniformity along the longitudinal and lateral directions. Accordingly, the photographic support is preferably subjected to multi-axial stretching along the directions. The multi-axial stretching can be conducted by a successive stretching method. The longitudinal stretching is preferably first conducted. In the preparation of the film of the present invention, the conditions of the longitudinal stretching are particularly important. In the present invention, it is not preferred to stretch the film twice or more.

Figure 2:
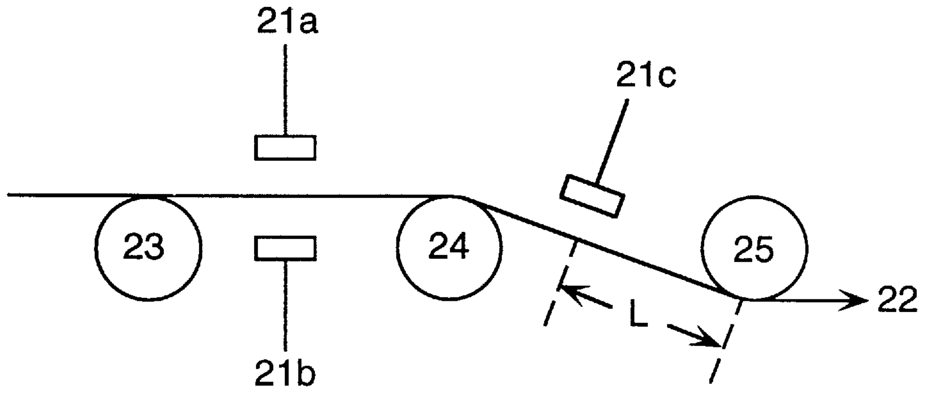
FIG. 2 is a sectional view schematically illustrating a process of stretching a syndiotactic styrenic polymer film along the longitudinal direction.

At the longitudinal stretching, the distance between the heater and the stretching rollers are preferably adjusted. FIG. 2 is a sectional view schematically illustrating a process of stretching a syndiotactic styrenic polymer film along the longitudinal direction. As is shown in FIG. 2, the film (22) is conveyed by the three rollers (23, 24 and 25) in the stretching machine. In the machine, the film is heated by heaters (21*a*, 21*b* and 21*c*). The rotating speed of the last roller (25) is faster than that of the middle roller (24). As a result, the film is stretched along the longitudinal direction.

In the present invention, the distance (L) between the last heater (21*c*) and the final roller (25) is preferably in the range of 10 to 50 cm, more preferably in the range of 15 to 40 cm, and most preferably in the range of 20 to 35 cm. The distance is measured, as is shown in FIG. 2. The distance is adjusted as is mentioned above to obtain appropriated physical properties (described below) of the film.

A halogen lamp, an infrared lamp, a Vycor heater or a ceramic heater can be used as the heater (21). The heater may be attached to a roller. Further, a heated gas (air or nitrogen gas) can be used as the heater.

The rollers is preferably made of metal or ceramic. The diameter of the roller is preferably in the range of 50 to 500 mm, and more preferably in the range of 100 to 350 mm.

The stretching temperature along the longitudinal direction is preferably in the range of the glass transition temperature (Tg) of the raw film to the glass transition point plus 50° C. (Tg+50), more preferably in the range of Tg+5 to Tg+30, and most preferably in the range of Tg+10 to Tg+25.

The stretching speed along the longitudinal direction is preferably in the range of 1,000 to 8,000% per minute, more preferably in the range of 2,000 to 6,000% per minute, and most preferably in the range of 2,500 to 4,000% per minute.

The longitudinal stretching degree is preferably in the range of 2.8 to 4.5 times, more preferably in the range of 3 to 4.2 times, and most preferably in the range of 3.2 to 4 times.

The longitudinally stretched film is then stretched latitudinally.

Before the latitudinal stretching, the film is preferably preheated. The heating temperature is preferably in the range of the latitudinal stretching temperature minus 30° C. to the latitudinal stretching temperature plus 30° C., more preferably in the range of the latitudinal stretching temperature minus 20° C. to the latitudinal stretching temperature plus 20° C., and most preferably in the range of the latitudinal stretching temperature minus 10° C. to the latitudinal stretching temperature plus 10° C. The heating time is preferably in the range of 1 second to 3 minutes, more preferably in the range of 5 seconds to 2 minutes, and most preferably in the range of 10 seconds to 1 minute.

The latitudinal stretching is preferably conducted by using a tenter.

The stretching temperature along the latitudinal direction is preferably in the range of the glass transition temperature (Tg) of the raw film to the glass transition point plus 50° C. (Tg+50), more preferably in the range of Tg+5 to Tg+30, and most preferably in the range of Tg+10 to Tg+25.

The stretching speed along the latitudinal direction is preferably in the range of 1,000 to 8,000% per minute, more preferably in the range of 2,000 to 6,000% per minute, and most preferably in the range of 2,500 to 4,000% per minute.

The latitudinal stretching degree is preferably in the range of 2.8 to 4.5 times, more preferably in the range of 3 to 4.2 times, and most preferably in the range of 3.2 to 4 times.

At the step (5), the film is subjected to a heat setting. The heat setting can be conducted while stretching the sheet. It can also be conducted while relaxing the sheet. The relaxation ratio is preferably in the range of 1 to 10%. The thermal relaxation can easily be conducted by controlling the width of the tenter used at the heat setting.

The heat setting temperature is preferably in the range of 180° to 250° C., and more preferably in the range of 190° to 240° C., and most preferably in the range of 200° to 230° C. The heating time is preferably in the range of 1 to 180 seconds, more preferably in the range of 5 to 90 seconds, and most preferably in the range of 10 to 60 seconds.

The obtained syndiotactic styrenic polymer film preferably has a Young's modulus in the range of 50 to 300 $kg/mm^2$ at 110° C. along a longitudinal direction and along a latitudinal direction. The Young's modulus is more preferably in the range of 70 to 250 $kg/mm^2$, and most preferably in the range of 90 to 220 $kg/mm^2$. To obtain the film of the present invention, the Young's modulus along a longitudinal direction is important. However, a film should also require the above-mentioned Young's modulus along a longitudinal direction to use the film practically, particularly as a photographic support.

The film preferably shows a dimensional change of not more than 0.8% along a longitudinal direction and along a latitudinal direction after the film is heated at 110° C. for 10 minutes. The dimensional change more preferably is not more than 0.6%, and most preferably is not more than 0.4%.

Further, the difference between Young's modulus along the longitudinal direction and that along the latitudinal direction is not more than 30% based on the larger value of the Young's moduli. The difference more preferably is not more than 25%, and most preferably is not more than 20. Furthermore, the difference between the dimensional change along the longitudinal direction and that along the latitudinal direction is not more than 0.6%. The difference more preferably is not more than 0.4%, and most preferably is not more than 0.3%. The above-mentioned differences are measured at five points along each of the longitudinal and latitudinal directions. The measuring points are arranged at the distance of 30 cm along the directions.

The film has a haze preferably of not more than 2%, more preferably of not more than 1.5%, and most preferably of not more than 1%. To decrease the haze and to obtain the above-mentioned Young's modulus, the film preferably has such a heat flow rate that the difference between the rate at 90° C. and that at 115° C. is in the range of 0.02 to 0.07 W/g. The difference in the heat flow rate is more preferably in the range of 0.03 to 0.06 W/g, and most preferably in the range of 0.035 to 0.05 W/g.

The difference in the heat flow rate can be decreased by (a) increasing the amount of crystals in the film or (b) increasing the amount of interphase in the film.

The method (a) might increase the haze or decrease the transparence of the film. The amount of the crystals can be measured by using a differential scanning calorimeter (DSC). In more detail, the amount of the crystals corresponds to the endotherm measured at the peak when the crystals are melt. The endotherm is measured while heating 5 to 10 mg of a sample at the heating rate of 20° C. per minute in a stream of nitrogen. The endotherm is preferably in the range of 10 to 30 J/g, more preferably in the range of 15 to 28 J/g, and most preferably in the range of 18 to 26 J/g.

The interphase at the method (b) is present between the crystalline phase and the non-crystalline phase in the film. The interphase has another function of preventing the non-crystalline phase from moving.

The syndiotactic styrenic polymer film preferably has a surface roughness of in the range of 0.001 to 0.02 $\mu$m in terms of Ra. The surface roughness is more preferably in the range of 0.002 to 0.015 $\mu$m, and most preferably in the range of 0.003 to 0.01 $\mu$m.

The syndiotactic styrenic polymer film preferably has a thickness in the range of 90 to 300 $\mu$m, more preferably in the range of 95 to 250 $\mu$m, and most preferably in the range of 100 to 200 $\mu$m.

The plastic film preferably does not contain spherulites having a diameter in the range of 0.05 to 5 $\mu$m to obtain a high ultraviolet transmittance. The amount of the spherulites preferably is not more than 30%, more preferably is not more than 20%, and most preferably is not more than 10% based on the volume amount of the film. The spherulites having a diameter in the range of 0.05 to 5 $\mu$m (particularly 0.1 to 3 $\mu$m, and more particularly 0.2 to 2 $\mu$m) reduces the ultraviolet transmittance. Accordingly, the occurrences of the spherulites having such a diameter should particularly be inhibited.

The size and the volume ratio of the spherulites are easily measured by a polarizing microscope. In more detail, the film is photographed through the polarizing microscope, after biaxially stretching and thermal fixing. The spherulites having the above-mentioned diameter are selected from the photograph. The volume ratio is calculated by dividing the total sectioned area by the split field in the eye piece. The volume ratio is usually expressed as percentage.

The other additives can be added to the plastic support so long as the object of the present invention is attained. Examples of the additives include inorganic particles (e.g., silica, talc, titania, alumina, calcium carbonate, calcium oxide, calcium chloride and mixtures thereof), organic particles (e.g., cross-linked polystyrene, cross-linked polymethyl methacrylate), antioxidants, antistatic agents and dyes. The amount of the additives is preferably in the range of 20 to 300 ppm, more preferably in the range of 30 to 200 ppm, and most preferably in the range of 40 to 100 ppm. The particle size of the additive is preferably in the range of 0.01 to 5 $\mu$m, more preferably in the range of 0.05 to 3 $\mu$m, and most preferably in the range of 0.1 to 1 $\mu$m. The shape of the particle of the additive is preferably spherical or amorphous (crashed shape).

The remaining amount of styrene monomer in plastic is preferably not more than 7,000 ppm to prevent precipitation of the monomer in the formation of a film.

The film preferably has the above-mentioned physical characteristics before the below-mentioned surface treatment and the coating of a layer. However, the characteristics are substantially not changed after the treating or coating process. Accordingly, the physical characteristics can also be measured after the treating or coating process. Therefore, the present invention defines the physical characteristics of the film regardless of the processing stage.

Surface Treatment

The polymer film of the present invention may be subjected to a glow discharge treatment, a corona discharge treatment, an ultraviolet treatment or a flame treatment. The corona discharge treatment is most preferred because it increases the adhesion of the film and the coated layer effectively.

The corona discharge treatment, the ultraviolet treatment, the glow discharge treatment and the flame treatment are described below.

The corona discharge treatment has been well known. The treatment can be performed by the processes described in Japanese Patent Publications No. 48(1973)-5043, No. 47(1972)-51905, No. 47(1972)-28067, No. 49(1974)-83767, No. 51(1976)-41770 and No. 51(1976)-131576. A discharge frequency is generally 50 Hz to 5,000 kHz and preferably 5 to 100 kHz. The treatment strength preferably is 0.001 to 5 KVA·A·minute/$m^2$, and more preferably is 0.01 to 1 KV·A·minute/$m^2$. A gap clearance between an electrode and a dielectric roll generally is in the range of 0.5 to 2.5 mm, and preferably in the range of 1.0 to 2.0 mm.

The ultraviolet treatment is performed according to the known methods described in Japanese Patent Publications No. 41(1966)-10385, No. 43(1968)-2603, No. 43(1968)-2604 and No. 45(1970)-3828. A high pressure or low pressure mercury lamp of a quarts tube having a main wavelength in the range of 180 to 380 nm is preferably used as the light source.

The amount of a light generally is 20 to 10,000 mJ/$cm^2$ in the case of using the high pressure mercury vapor lamp of a main wavelength of 365 nm, and preferably 50 to 2,000 mJ/$cm^2$. The amount of a light generally is 100 to 10,000 mJ/$cm^2$ in the case of using the low pressure mercury vapor lamp of a main wavelength of 365 nm, and preferably 300 to 1,500 mJ/$cm^2$.

The glow discharge treatment has been known, and is described in Japanese Patent Publications No. 35(1960) 7578, No. 36(1961)-10336, No. 45(1970)-22004, No. 45(1970)-24040, No. 46(1971)-43480, Japanese Patent Provisional Publication No. 53(1978)-129262, U.S. Pat. Nos. 3,057,792, 3,057,795, 3,179,482, 3,288,638, 3,309,299, 3,424,735, 3,462,335, 3,475,307, 3,761,299, 4,072,769, British Patents No. 891,469 and 997,093.

The glow discharge treatment is particularly effective in a vapor atmosphere to obtain a strong adhesion. The vapor atmosphere is also effective in inhibiting a yellowish coloring of the support or inhibiting blocking.

The glow discharge treatment is preferably conducted under conditions that the content of water vapor in the air is not less than 10%, more preferably is 40 to 90%. The content of water vapor can be measured by a mechanical spectrometer. The partial pressure of the vapor at the glow discharge treatment is preferably in the range of 10 to 100%, and more preferably in the range of 40 to 90%. In the case that the pressure is less than 10%, it is difficult to obtain a sufficient adhesion between the film and the coated layer. The gas other than vapor is the air comprising oxygen and nitrogen.

The glow discharge treatment is preferably conducted under a reduced pressure while heating the support to shorten the treatment time and to increase the adhesion effectively.

The preheat temperature is preferably in the range of 50° C. to the glass transition point (Tg), more preferably in the range of 60° C. to Tg, and most preferably in the range of 70° C. to Tg. In the case that the temperature is higher than Tg, the adhesion is degraded.

With respect to the glow discharge treatment conditions, pressure is preferably in the range of 0.005 to 20 Torr, and more preferably in the range of 0.02 to 2 Torr.

The voltage is preferably in the range of 500 to 5,000 V, and more preferably in the range of 500 to 3,000 V.

A discharge frequency preferably is in the range of 0 (i.e., a direct current) to several thousands MHz, more preferably in the range of 50 Hz to 20 MHz, and most preferably in the range of 1 Hz to 1 MHz.

The strength of a discharge treatment preferably is in the range of 0.01 to 5 KV·A·minute/$m^2$ and more preferably in the range of 0.15 to 1 KV·A·minute/$m^2$ because of obtaining a desired adhesion strength.

Immediately after the glow discharge treatment, the support is preferably cooled using cooling rolls.

After the glow discharge treatment, the ratio of oxygen to carbon on the surface of the film is preferably in the range of 0.05 to 0.30, more preferably in the range of 0.08 to 0.25, and most preferably in the range of 0.10 to 0.23. The ratio is measured by an X-ray photoelectric spectroscopy (XPS). The amount of oxygen is obtained by dividing the peak area of the signal at 525 to 545 eV (1s of oxygen) by 2.85 (sectioned area of ionization). The amount of carbon is obtained by dividing the peak area of the signal at 300 to 270 eV (1s of carbon) by 1 (sectioned area of ionization). Further, the ratio of nitrogen to carbon on the surface of the film is preferably in the range of 0.005 to 0.06, more preferably in the range of 0.008 to 0.04, and most preferably in the range of 0.010 to 0.03. The amount of nitrogen is obtained by dividing the peak area of the signal at 410 to 390 eV (1s of nitrogen) by 1.77 (sectioned area of ionization).

The flame treatment is conducted by use of a natural gas or a liquid propane gas. The ratio of the gas to the air is important. The volume ratio of the propane gas to the air is preferably in the range of 1/14 to 1/22, and more preferably in the range of 1/16 to 1/19. The volume ratio of the natural gas to the air is preferably in the range of ⅙ to 1/10, and more preferably in the range of 1/7 to 1/9.

The flame treatment is preferably conducted in the range of 1 to 10 Kcal/m$^2$, and more preferably in the range of 3 to 30 Kcal/m$^2$. The distance between the flame of the burner is preferably not longer than the 4 cm. The treatment apparatus is available from Kasuga Electric Co., Ltd. The backup roll for the support preferably is a hollow roll containing cooling water to keep a constant temperature.

Coated Layer

A layer layers is coated on the surface treated film. The coated layer generally has a thickness in the range of 0.001 to 5 $\mu$m, more preferably in the range of 0.005 to 1 $\mu$m, and most preferably in the range of 0.01 to 0.5 $\mu$m.

The coated layer functions as an undercoating layer or a first backing layer in a silver halide photographic material. The undercoating layer and a silver halide emulsion layer are provided on one side of the photographic support (the film of the present invention). The backing layer is provided on the other side of the support. The undercoating and backing layers are described below.

The undercoating layer may comprise a first coating layer and a second coating layer. The first coating layer adheres to the support, and the second coating layer adheres to the silver halide emulsion layer.

The first undercoating layer may contain an epoxy resin, gelatin, nitrocellulose, polyvinyl acetate or other polymers. The polymers may be made from vinyl chloride, vinylidene chloride, butadiene, vinyl acetate, styrene, acrylonitrile, methacrylic ester, methacrylic acid, itaconic acid or maleic anhydride. If necessary, the first undercoating layer may contain a cross-linking agent (e.g., triazine compounds, epoxy compounds, melamine compounds, isocyanate compounds such as block isocyanate, aziridine compounds, oxazoline compounds), inorganic particles (e.g., colloidal silica), surface active agents, adhesive agents, dyes or preservatives. These additives are described in H. H. Immergut, Polymer Handbook, VI 1867 to 231, Interscience, Pub. New York (1966), Japanese Patent Provisional Publications No. 50(1975)-39528, No. 50(1975)-47196, No. 50(1975)-63881, No. 51(1976)-133526, No. 64(1989)-538, No. 63(1988)-174698, No. 3(1991)-109545, No. 1(1989)-240965, No. 2(1990)-184844, 48(1963)-89870 and No. 48(1973)-93672. The second undercoating layer substantially consists of gelatin.

In the case that the undercoating layer consists of a single layer, the support is swelled to mixing the polymers of the support and the undercoating layer along the interface. Thus the adhesion along the interface is increased. Examples of the undercoating polymers include a water soluble polymer, cellulose ester, a latex polymer and a water soluble polyester. Examples of materials for the water soluble polymer include gelatin, gelatin derivatives, casein, agar, sodium alginate, starch, polyvinyl alcohol, an acrylic acid-containing copolymer and a maleic anhydride-containing copolymer. Examples of materials for the latex polymer include a vinyl chloride-containing copolymer, a vinylidene chloride-containing copolymer, an acrylic acid ester-containing copolymer, a vinyl acetate-containing copolymer and a butadiene-containing copolymer. Gelatin is most preferred. Lime-treated gelatin, acid-treated gelatin, enzyme-treated gelatin, gelatin derivative and de-natured gelatin are available. Lime-treated gelatin and acid-treated gelatin are particularly preferred.

Other hydrophilic colloids can also be used. Examples of the hydrophilic colloids include colloidal albumin, casein, agar, sodium alginate, starch derivatives, carboxymethyl cellulose, hydroxymethyl cellulose, polyvinyl alcohol, poly-N-vinyl pyrrolidone, polyacrylamide amide and copolymers thereof. Two or more polymers may be used in combination.

The thickness of the undercoating layer is usually in the range of 0.01 to 10 $\mu$m, and more preferably in the range of 0.1 to 7 $\mu$m.

The total thickness of the two or more undercoating layers is preferably in the range of 1.5 to 10 $\mu$m on the emulsion side or in the range of 0.5 to 5 $\mu$m on the backing side.

The backing layers include a hydrophilic layer and a hydrophobic layer. In the case that hydrophilic and hydrophobic layers are provided on the polymer film, the hydrophobic layer is provided on the hydrophilic layer.

The hydrophilic backing layer consists of a hydrophilic colloid. The hydrophilic layer functions as an anticurl layer which compensates the curl caused by the shrinkage of the hydrophilic colloid contained in photographic layers. Examples of the hydrophilic colloids are the same as the examples of the colloids used in the undercoating layers. The coating amount is preferably so adjusted that the ratio of the coating amount of the hydrophilic colloid contained in the backing layers to the coating amount of the hydrophilic colloid contained in the photographic layers is not more than 0.5. The coating amount means the total amount of the backing layers or the photographic layers. The coating amount also means the total amounts of two or more hydrophilic colloids, in the case that two or more colloids are used in a single layer or two or more layers.

The hydrophobic backing layer functions as a water-resistant layer. The hydrophobic layer can be formed by coating and drying a polymer as a binder. Examples of the polymers include (meth)acrylic ester polymers (e.g., polymethyl methacrylate, polyethyl acrylate), olefin polymers (e.g., polyethylene), styrene polymers, vinylidene chloride, urethane polymers and rubber polymers (e.g., polybutadiene).

A polymer latex may be added to the backing layer. The polymer latex is an aqueous dispersion of a water-insoluble polymer. The average particle size of the latex is preferably in the range of 20 to 200 $\mu$m. The dry amount ratio of the latex to a binder is preferably in the range of 0.01 to 1.0, and more preferably in the range of 0.1 to 0.8. The polymers in the latex is preferably made from alkyl acrylates, hydroxyalkyl acrylates, glycidyl acrylates, alkyl methacrylates, hydroxyalkyl methacrylates and glycidyl methacrylates. The average molecular weight of the polymer is preferably not less than 100,000, and more preferably in the range of 300,000 to 500,000. Examples of the polymers are shown below.

(Polymer 1)

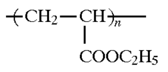

(Polymer 2)

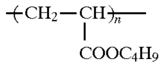

-continued (Polymer 3)

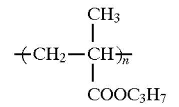

(Polymer 4)

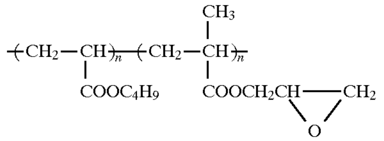

(Polymer 5)

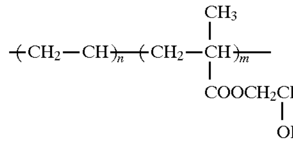

(Polymer 6)

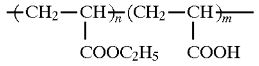

The backing layer may contain a plasticizer. Examples of the plasticizers include phthalic esters (e.g., dibutyl phthalate, diisooctyl phthalate, diphenyl phthalate), glycol derivatives (e.g., diethylene glycol, diethylene glycol dioctyl ether, triethylene acetate glycol), phosphoric esters (e.g., triphenyl phosphate, tridecyl phosphate) and ketones (e.g., cyclodekanone, n-octadecanone, n-octadekane-3,6,9-trione). Two or more plasticizers may be used in combination.

The amount of the plasticizer is preferably in the range of 0.1 to 100 wt. %, and more preferably in the range of 3 to 10 wt. % based on the solid content of the polymer.

An organic solvent having a boiling point of lower than 250° C. may be added to the polymer latex.

Examples of the organic solvents include cellosolves (e.g., ethylcellosolve, butylcellosolve), alcohols (e.g., isopropanol, n-butanol, sec-butanol, furfuryl alcohol), glycols (e.g., ethylene glycol monobutyl ether, diethylene glycol monoethyl ether, ethyl acetate glycol monoethyl ether).

Two or more organic solvents may be used in combination.

Two or more polymer layers may be provided on the support as the backing layers. The thickness of the hydrophobic polymer layer (the total thickness of two or more layers) is preferably in the range of 0.05 to 10 $\mu$m, and more preferably in the range of 0.1 to 5 $\mu$m.

The backing layers may further contain a matting agent, a slipping agent, an antistatic agent, a surface active agent, a cross-linking agent and an electroconductive substance.

The backing layers may be coated on the support according to conventional methods, such as a dip coating method, an air knife coating method, a curtain coating method, a roller coating method, a wire bar coating method, a gravure coating method, an extrusion coating method and a simultaneous multi-layered coating method. The extrusion method using a hopper is described in U.S. Pat. No. 2,681,294. The simultaneous coating method is described in U.S. Pat. Nos. 2,761,418, 3,508,947 and 2,761,791.

The above-mentioned coated layer (undercoating layer or backing layer) preferably further contains a polyamide-epihalohydrin resin having a weight average molecular weight in the range of 5,000 to 10,000. The molecular weight is more preferably in the range of 8,000 to 80,000, and most preferably in the range of 10,000 to 50,000.

The polyamide-epihalohydrin resin is synthesized by reacting a polyamide resin with an epihalohydrin. The polyamide is synthesized by reacting dibasic carboxylic acid with a polyalkylene amine.

Various saturated or unsaturated dibasic carboxylic acids can be used. The saturated dibasic carboxylic acids mean alkylene dicarboxylic acids. Examples of the alkylene dicarboxylic acids include oxalic acid, malonic acid, succinic acid, glutaric acid, adipic acid, pimelic acid, suberic acid, azelaic acid, sebacic acid, undecane dicarboxylic acid, dodecane dicarboxylic acid and cyclohexane dicarboxylic acid. The unsaturated dibasic carboxylic acids include alkenylene dicarboxylic acids, alkynylene dicarboxylic acids and arylene dicarboxylic acids. Examples of the alkenylene dicarboxylic acids include maleic acid, fumaric acid and 2-pentene dicarboxylic acid. An example of the alkynylene dicarboxylic acid is 4-hexyne dicarboxylic acid. Examples of the arylene dicarboxylic acids include phthalic acid, isophthalic acid, terephthalic acid and naphthalene dicarboxylic acid. The number of the carbon atoms except carboxylic groups in the acid is preferably in the range of 2 to 8, more preferably in the range of 2 to 6.

Examples of the polyalkylene amines include diethylene triamine, triethylene tetramine, tetraethylene pentamine, pentamethylene hexamine, hexamethylene heptamine, polyethylene imine, dipropylene triamine, tripropylene tetramine, tetrapropylene pentamine and polypropylene imine.

Examples of the epihalohydrins include epichlorohydrin, epibromohydrin and epiodohydrin. Epichlorohydrin and epibromohydrin are preferred. Epichlorohydrin is particularly preferred.

Examples of the polyamide-epihalohydrin resins are shown below. In the following examples, A means the polyalkylene amines, B means the dibasic carboxylic acid, and C means the epihalohydrins.

| | |
|---|---|
| (PH-1) | |
| A: Diethylene triamine | |
| B: Oxalic acid | |
| C: Epichlorohydrin | |
| Molar ratio: | 1.05:1.00:1.08 |
| Weight average molecular weight: | 17,800 |
| (PH-2) | |
| A: Diethylene triamine | |
| B: Glutaric acid | |
| C: Epichlorohydrin | |
| Molar ratio: | 1.07:1.00:1.05 |
| Weight average molecular weight: | 3,4700 |
| (PH-3) | |
| A: Diethylene triamine | |
| B: Adipic acid | |
| C: Epichlorohydrin | |
| Molar ratio: | 1.05:1.00:1.08 |
| Weight average molecular weight: | 26,900 |
| (PH-4) | |
| A: Diethylene triamine | |
| B: Suberic acid | |
| C: Epichlorohydrin | |

-continued

| | |
|---|---|
| Molar ratio: | 1.12:1.00:1.06 |
| Weight average molecular weight: | 25,400 |
| (PH-5) | |
| A: Diethylene triamine | |
| B: Maleic acid | |
| C: Epichlorohydrin | |
| Molar ratio: | 1.04:1.00:0.98 |
| Weight average molecular weight: | 20,200 |
| (PH-6) | |
| A: Diethylene triamine | |
| B: Phthalic acid | |
| C: Epichlorohydrin | |
| Molar ratio: | 1.03:1.00:1.08 |
| Weight average molecular weight: | 19,500 |
| (PH-7) | |
| A: Triethylene tetramine | |
| B: Adipic acid | |
| C: Epichlorohydrin | |
| Molar ratio: | 1.08:1.00:2.00 |
| Weight average molecular weight: | 33,800 |
| (PH-8) | |
| A: Tetraethylene pentamine | |
| B: Oxalic acid | |
| C: Epichlorohydrin | |
| Molar ratio: | 1.08:1.00:3.18 |
| Weight average molecular weight: | 22,400 |
| (PH-9) | |
| A: Pentaethylene hexamine | |
| B: Oxalic acid | |
| C: Epichlorohydrin | |
| Molar ratio: | 1.04:1.00:2.81 |
| Weight average molecular weight: | 12,400 |
| (PH-10) | |
| A: Dipropylene triamine | |
| B: Oxalic acid | |
| C: Epichlorohydrin | |
| Molar ratio: | 1.10:1.00:1.05 |
| Weight average molecular weight: | 64,500 |
| (PH-11) | |
| A: Diethylenetriamine | |
| B: Oxalic acid | |
| C: Epichlorohydrin | |
| Molar ratio: | 1.05:1.00:1.08 |
| Weight average molecular weight: | 17,800 |

The above-mentioned polyamide-epihalohydrin resin of a high molecular weight can be obtained from a polyamide resin of a high molecular weight. The polyamide resin can be synthesized by two steps of reactions. At the first step, a prepolymer is formed from a dibasic carboxylic acid and the exactly same amount (mole) of a polyamine. At the second step, the prepolymers are condensed by adding a small excess amount of the polyamine to the polymers. Thus prepared resin has a weight average molecular weight of not smaller than 5,000. Synthesis examples are shown below.

SYNTHESIS EXAMPLE 1

Synthesis of Resin (PH-3)

In a three-necked flask of 1 liter having a cooling tube, a thermometer and a stirring device, 51.59 g (0.50 mol) of diethylene triamine and 20 ml of water were placed. The mixture was dissolved in a stream of nitrogen. To the flask, 73.07 g (0.50 mol) of adipic acid was added while keeping the temperature in the flask of not higher than 40° C. The addition was divided into three times. After the addition, the mixture was stirred for 50 minutes. The mixture was heated at 115° to 155° C. for 3 hours to remove about 30 g of water. To the flask, 2.58 g (0.025 mol) of diethylene triamine was added. The mixture was heated at 170° to 190° C. for 4 hours to remove about 1 g of water. The reaction mixture was cooled to 150° C. To the mixture, 500 ml of water was added. The mixture was dissolved in water to obtain an aqueous polyamide solution.

To the aqueous solution, 49.9 g (0.54 mol) of epichlorohydrin was dropwise added for 40 minutes while stirring the solution at 60° C. After the addition, the mixture was heated to 75° C. The mixture was reacted for 1.5 hour. The reaction mixture was cooled to the room temperature. The mixture was adjusted to pH 4.9 using 20% aqueous solution of hydrochloric acid. Further, water was added to the mixture make up to 1,000 g to obtain 1,000 g of the solution of the subject resin (PH-3).

SYNTHESIS EXAMPLE 2

Synthesis of Resin (PH-10)

In a three-necked flask of 5 liters having a cooling tube, a thermometer and a stirring device, 524.88 g (4.00 mol) of dipropylene triamine and 200 ml of water were placed. The mixture was dissolved in a stream of nitrogen. To the flask, 472.36 g (4.00 mol) of succinic acid was added while keeping the temperature in the flask of not higher than 50° C. The addition was divided into ten times. After the addition, the mixture was stirred for 30 minutes. The mixture was heated at 115° to 165° C. for 3 hours to remove about 270 g of water. To the flask, 52.49 g (0.40 mol) of dipropylene triamine was added. The mixture was heated at 170° to 220° C. for 2 hours to remove about 10 g of water. The reaction mixture was cooled to 120° C. To the mixture, 4,000 ml of water was added. The mixture was dissolved in water to obtain an aqueous polyamide solution.

To the aqueous solution, 388.58 g (4.20 mol) of epichlorohydrin was dropwise added for 60 minutes, while stirring the solution at 55° C. After the addition, the mixture was heated to 75° C. The mixture was reacted for 2 hours. The reaction mixture was cooled to the room temperature. The mixture was adjusted to pH 4.5 using 20% aqueous solution of hydrochloric acid. Further, water was added to the mixture make up to 5,000 g to obtain 5,000 g of the solution of the subject resin (PH-10).

The amount of the polyamide-epihalohydrin is preferably in the range of 0.5 to 25 wt. %, more preferably in the range of 1.0 to 15 wt. %, and most preferably in the range of 3.0 to 10 wt. % based on the amount of the binder of the coated layer (such as gelatin).

After the layer was coated, the film having the layer is dried. In the present invention, the film is dried preferably at 50° to 200° C. while conveying the film on rollers. The rollers are preferably arranged at a distance in the range of 0.1 to 10 m.

The drying temperature is more preferably in the range of 50° to 150° C., and further preferably in the range of 60° to 150° C., and most preferably in the range of 70° to 140° C.

If the drying temperature is high, the waviness of the film is remarkably caused. If the drying temperature is low, the adhesion between the film and the layer is decreased. The latter problem can be solved by improving the surface treatment of the support and the contents of the layer, as is described above.

The layer can be dried by a nichrome heater, an infrared lamp, a halogen lamp or a mercury lamp. The temperature can easily be controlled by adjusting the power of the heating means. The layer can also be dried by a heated air.

The temperature can be controlled by adjusting the temperature and the amount of the heated air.

The waviness of the film is usually caused between the rollers at the drying step. Therefore, the distance of the rollers are also important. The distance is more preferably in the range of 0.5 to 5 m, and more preferably in the range of 1 to 3 m.

The film is conveyed on rollers while 3 to 200 cm of the film is in contact with each of the rollers. The length of the film in contact with the roller is more preferably in the range of 5 to 150 cm, and most preferably in the range of 10 to 100 cm.

Further, the film is conveyed on rollers while applying a tension of 2 to 40 kg/m to the film. The tension is more preferably in the range of 3 to 30 kg/m, and most preferably in the range of 4 to 20 kg/m.

The roller preferably has a smooth surface. The roller can be made of a metal (e.g., stainless, iron, aluminum) or a thermosetting resin. Stainless is particularly preferred.

Silver Halide Photographic Material

A silver halide emulsion is usually prepared from a reaction of a water-soluble silver salt (e.g., silver nitrate) with a water-soluble halide salt (e.g., potassium bromide) in an aqueous solution of a water-soluble polymer (e.g., gelatin).

Silver chloride, silver bromide, silver chlorobromide, silver iodobromide and silver chloroiodobromide are available. There is no specific limitation with respect to the grain shape and the grain size distribution.

The silver halide emulsion layer may further contain a chemical sensitizer, a spectral sensitizer, an antifogging agent, a hydrophilic colloid (e.g., gelatin), a hardening agent for gelatin, a surface active agent and an adhesive agent. The additives are described in Research Disclosure, volume 176, item 17643 (December 1978), and Japanese Patent Provisional Publications No. 52(1977)-108130, No. 52(1977)-114328, No. 52(1977)-121321, No. 53(1978)-3217 and No. 53(1978)-44025.

If necessary, the photographic material of the present invention may have a surface resistance of not higher than $10^{12}$.

Various means are available for decreasing the surface resistance. For example, Japanese Patent Provisional Publications No. 58(1983)-62648, No. 58(1983)-62649 and No. 51(1976)-115291 disclose a method of adding fine oxide particles of Sn, Zn, Ti, In or V. Japanese Patent Provisional Publications No. 57(1982)-204540 and 54(1979)-133324 disclose a method of adding a polymer. Japanese Patent Provisional Publications No. 64(1989)-26849 and No. 61(1986)-24907 disclose a method of adding a surface active agent. A metal oxide such as $SnO_2$ is preferably used.

An electroconductive crystal of oxide or a complex oxide thereof is preferably used as the fine metal oxide particle.

The fine metal oxide particles preferably have a volume resistance of not higher than $10^7$ Ω, and more preferably not higher than 105 Ω. The particle size is preferably in the range of 0.01 to 0.7 μm, and more preferably in the range of 0.02 to 0.5 μm.

The process for the preparation of the fine metal oxide particles is described in Japanese Patent Provisional Publication No. 56(1981)-143430. The metal particles may be prepared in the presence of a hetero atom. The hetero atom is incorporated into the particles to increase the conductivity. Further, an oxygen defect may be introduced into the fine particles. ZnO particles may contain Al or In. $TiO_2$ particles may contain Nb or Ta. $SnO_2$ particles may contain Sb, Nb or a halogen atom. The amount of the hetero atom is preferably in the range of 0.01 to 30 mol %, and more preferably in the range of 0.1 to 10 mol %.

$SnO_2$ particles containing Sb is particularly preferred.

A non-light-sensitive hydrophilic colloidal layer may be provided on the photographic material. The colloidal layer usually contains a dye. Various dyes are available. For example, U.S. Pat. Nos. 3,455,693, 2,548,564, 4,124,386, 3,625,694, Japanese Patent Provisional Publications No. 47(1972)-13935, No. 55(1980)-33172, No. 56(1981)-36414, No. 57(1982)-161853, No. 52(1977)-29727, No. 61(1986)-198148, No. 61(1986)-177447, No. 61(1986)-217039 and No. 61(1986)-219039 disclose dyes adsorbed on mordents. Japanese Patent Provisional Publications No. 61(1986)-213839, No. 63(1988)-208846, No. 63(1988)-296039 and No. 1(1989)-15439 disclose nondiffusion dyes. Japanese Patent Provisional Publication No. 3(1991)-109535 discloses dyes dissolved in oil which is dispersed in a layer. U.S. Pat. Nos. 2,719,088, 2,498,841, 2,496,843, Japanese Patent Provisional Publications No. 60(1985)-45237 and No. 3(1991)-5748 disclose dyes adsorbed on the surface of inorganic substance. Japanese Patent Provisional Publication No. 2(1990)-298939 discloses dyes adsorbed on a polymer. Japanese Patent Provisional Publications No. 56(1981)-12639, No. 55(1980)-155350, No. 55(1980)-155351, No. 63(1988)-27838, No. 63(1988)-197943, No. 2(1990)-264936, European Patents No. 15,601, No. 274,723, No. 276,566, No. 299,435 and WO 88/04794 disclose water-insoluble solid dyes. The solid dyes are particularly preferred.

An image forming method for a lithographic plate is described bellow.

A printed negative original film having an image (e.g., test chart) is laminated on the photographic material of the present invention. The emulsion layers are contact with each other. The lamination is then exposed to light. The exposure may be conducted in a conventional machine (for example, P-627FM, Dainippon Screen Co., Ltd.). Further, a laser plotter (for example, Raster Graph RG-5000, Dainippon Screen Co., Ltd.) and a scanner (for example, Direct Scanner Graph SG-757, Dainippon Screen Co., Ltd. or Lux Scan 4500, Fuji Photo Film Co., Ltd.) can be used to expose the photographic material directly. The direct exposing method is particularly preferred.

After the exposure, the photographic material is developed according to a conventional process. The development can be conducted in an authomatic developing machine (for example, FG-680AG, Fuji Photo Film Co., Ltd.)

The exposed and developed photographic material of the present invention is then laminated on a negative or positive presensitized lithographic plate. The presensitized lithographic plate is described in Japanese Patent Provisional Publication No. 3(1991)-273250. The lamination is then exposed to ultraviolet using a mercury lump or a metal halide lamp (e.g., PS light, Fuji Photo Film Co., Ltd.). The plate is then developed and rinsed according to a conventional process to obtain a lithographic plate.

EXAMPLE 1

(1) Synthesis of Plastic Polymer

In a reaction vessel, 6 liter of toluene (solvent), 5 mmol of tetraethoxytitanium and 500 mmol (in terms of aluminum) of methylaluminoxane were placed. Further, 48.94 mol of styrene and 1.06 mol of p-methylstyrene were added to the mixture at 50° C. The polymerization reaction proceeded for 2 hours.

After the reaction, the product was washed with a mixture of hydrochloric acid and ethanol to decompose and remove the catalyst. The product was dried to obtain 640 g of a copolymer. The weight average molecular weight (Mw) of the copolymer was 440,000, and the number average molecular weight (Mn) was 240,000. The copolymer was analyzed by $^{13}$C-NMR. As a result, absorption peaks were observed at 145.00, 145.22 and 142.09 ppm. The ratio of the racemic pentad of the styrene units as tacticity was 75%, which was calculated from the peak areas. Thus, a syndiotactic styrenic polymer (SPS-1) was prepared. The glass transition temperature (Tg) and the melting point (Tm) were 97° C. and 250° C. respectively.

The polymerization reactions were repeated in the same manner as is mentioned above, except that the molar ratio of styrene to p-methylstyrene was changed to 50/0 or 47.88/2.12 to form a syndiotactic polymer (p-methyl styrene content: 0 wt. %) or copolymers (p-methyl styrene content: 10 wt. %). The Mw of the polymers were 400,000 and 420,000 respectively. The Mn of the polymers were 220,000 and 230,000 respectively. The tacticities of the polymers were 74% and 71% respectively. Thus, syndiotactic styrenic polymers (SPS-2) and (SPS-3) were prepared. The glass transition temperatures of the polymers were 100° C. and 95° C. respectively. The melting points of the polymers were 257° C. and 248° C.

The glass transition point (Tg) and the melting point (Tm) were measured by a differential thermal analysis (DSC) according to the following manner.

(a) The sample (10 g) was heated to 330° C. at the rate of 20° C. per minute under nitrogen atmosphere.

(b) The sample was immediately cooled to the room temperature, and was heated at the rate of 20° C. per minute.

Tg was evaluated as the average of the temperature at which the shape of the base line was changed and the temperature at which a new base line was formed.

Tm was the temperature showing the maximum peak of the endotherm. The temperature was higher than Tc.

(2) Formation of the Support (2-1) Extrusion to formation of raw film

The above-prepared polymers were dried at 150° C. under reduced pressure to obtain crystallized pellets. The monomer content in the pellets was 900 to 1,000 ppm.

The pellets of the polymers SPS-1 and SPS-2 were placed in an extruding machine having a filter and T-die, and then extruded at 300° C. Further, a mixture of SPS-2 and SPS-3 (mixing ratio: 2/1) was placed in the extruding machine, and then extruded at 300° C. Before the extrusion, the polymers were filtered through a sintered metal filter. The T-die extruding machine was preheated at 320° C.

The melt was biaxially stretched while applying an electrostatic charge to the film. The casting was conducted set forth in Table 1. The longitudinal stretching was conducted at 120° C. The longitudinal stretching rate was 3.2 times. The latitudinal stretching was conducted at 125° C. The latitudinal stretching rate was 3.3 times.

The obtained biaxially stretched films were subjected to a heat setting at 240° C. for 30 seconds while conducting a thermal relaxation of 5%. Thus, syndiotactic styrenic polymer films of SPS-1, SPS-2 and a mixture of SPS-2 and SPS-3 (2+3) were prepared. Further, a polyethylene terephthalate (PET) polymer film was prepared according to a conventional method for comparison.

(3) Surface Treatment of the Support

The both surfaces of the support were subjected to a glow charge treatment in the following manner.

Four cylindrical rods (electrodes) were fixed on an insulated board at the distance of 10 cm. The rod had the sectioned diameter of 2 cm and the length of 150 cm. A cooling medium flowed in the hollow of the rod. The electrode board was fixed in a vacuum tank. A biaxially stretched film was moved parallel to the electrode face at the distance of 15 cm. The moving speed was controlled to subject the surface to the treatment for 2 seconds.

The film is conveyed on a heated roll having a thermostat for three quarters round just before the film reaches the electrode. The heated roll has the diameter of 50 cm. Further, a thermocouple thermometer was in contact with the surface of the film between the heated roll and the electrode zone to control the surface temperature at 90° C.

The pressure in the vacuum tank was 0.2 Torr. The partial pressure of $H_2O$ in the atmosphere was 75%. The charge frequency was 30 KHz. The power was 2,500 W. The treatment strength was 0.5 KV·A·minute/m$^2$. After the charge treatment, the support was conveyed on a cooling roll having a thermostat. The diameter of the roll was 50 cm. The support was then wound up.

(4) Preparation of Photographic Material (4-1) Formation of undercoating layer The coating solution for an undercoating layer having the following composition was coated on the treated surface of the support using a wire bar in the coated amount of 10 ml/m$^2$. The support was then dried under conditions set forth in Table 1 while applying the tension of 10 kg/M$^2$ to the film.

| Undercoating layer | |
|---|---|
| Gelatin | 10.0 weight parts |
| Water | 24.0 weight parts |
| Methanol | 961.0 weight parts |
| Salicylic acid | 3.0 weight parts |
| Polyamide-epichlorohydrin resin (described in synthesis example 1 of Japanese Patent Provisional Publication No: 51(1976)-27099) | 0.5 weight part |
| Nonion surface active agent (Compound I-13 described in Japanese Patent Publication No. 3(1991)-27099) | 1.0 weight part |

The surface of the films were observed in the following manner. The results are set forth in Table 1.

TABLE 1

| | | Drying conditions | | | | Surface conditions | | |
|---|---|---|---|---|---|---|---|---|
| No. | Polymer | (a) | (b) | (c) | (d) | (e) | (f) | (g) |
| 1-1 | SPS-1 | 100° C. | 2.0 m | 15 cm | 12 | 0 | 2 mm | 2 |
| 1-2 | SPS-1 | 210° C. | 2.0 m | 15 cm | 12 | 4 | 42 mm | 53 |
| 1-3 | SPS-1 | 185° C. | 2.0 m | 15 cm | 12 | 0 | 12 mm | 11 |
| 1-4 | SPS-1 | 60° C. | 2.0 m | 15 cm | 12 | 0 | 1 mm | 0 |
| 1-5 | SPS-1 | 40° C. | 2.0 m | 15 cm | 12 | 0 | 1 mm | 0 |
| 1-6 | SPS-1 | 100° C. | 9.0 m | 15 cm | 12 | 0 | 15 mm | 5 |
| 1-7 | SPS-1 | 100° C. | 11.0 m | 15 cm | 12 | 1 | 21 mm | 6 |
| 1-8 | SPS-1 | 100° C. | 2.0 m | 210 cm | 12 | 0 | 5 mm | 39 |

TABLE 1-continued

| | | Drying conditions | | | | Surface conditions | | |
|---|---|---|---|---|---|---|---|---|
| No. | Polymer | (a) | (b) | (c) | (d) | (e) | (f) | (g) |
| 1-9 | SPS-1 | 100° C. | 2.0 m | 190 cm | 12 | 0 | 4 mm | 22 |
| 1-10 | SPS-1 | 100° C. | 2.0 m | 15 cm | 38 | 0 | 11 mm | 9 |
| 1-11 | SPS-1 | 100° C. | 2.0 m | 15 cm | 40 | 0 | 17 mm | 12 |
| 1-12 | 2 + 3 | 100° C. | 2.0 m | 15 cm | 12 | 0 | 3 mm | 3 |
| 1-13 | 2 + 3 | 210° C. | 2.0 m | 15 cm | 12 | 4 | 44 mm | 63 |
| 1-14 | 2 + 3 | 185° C. | 2.0 m | 15 cm | 12 | 0 | 15 mm | 17 |
| 1-15 | 2 + 3 | 60° C. | 2.0 m | 15 cm | 12 | 0 | 1 mm | 0 |
| 1-16 | 2 + 3 | 40° C. | 2.0 m | 15 cm | 12 | 0 | 1 mm | 0 |
| 1-17 | 2 + 3 | 100° C. | 9.0 m | 15 cm | 12 | 0 | 17 mm | 6 |
| 1-18 | 2 + 3 | 100° C. | 11.0 m | 15 cm | 12 | 1 | 23 mm | 7 |
| 1-19 | 2 + 3 | 100° C. | 2.0 m | 210 cm | 12 | 0 | 6 mm | 40 |
| 1-20 | 2 + 3 | 100° C. | 2.0 m | 190 cm | 12 | 0 | 5 mm | 24 |
| 1-21 | 2 + 3 | 100° C. | 2.0 m | 15 cm | 38 | 0 | 12 mm | 9 |
| 1-22 | 2 + 3 | 100° C. | 2.0 m | 15 cm | 42 | 0 | 18 mm | 14 |
| 1-23 | SPS-2 | 100° C. | 2.0 m | 15 cm | 12 | 0 | 2 mm | 2 |
| 1-24 | PET | 100° C. | 2.0 m | 15 cm | 12 | 0 | 0 mm | 0 |

(Remark)
(a): The drying temperature
(b): The distance between rollers
(c): The length of the film in contact with a roller
(d): The tension (kg/m) applied to the film
(e): Number of creasing formed on the film (width: 30 cm, length: 1 m)
(f): The height of the waviness
(g): Number of hard spots formed in the film (area: 5 $cm^2$)

(4-3) Formation of backing layers

On the reverse side of the support, the following electroconductive backing layer and the surface backing layer were simultaneously coated.

| Electroconductive backing layer | |
|---|---|
| $SnO_2$/Sb | 200 mg/$m^2$ |
| (weight ratio: 9/1, average particle size: 0.25 μm) | |
| Gelatin ($Ca^{2+}$ content: 3,000 ppm) | 77 mg/$m^2$ |
| Compound (6) | 7 mg/$m^2$ |
| Sodium dodecylbenzenesulfonate | 10 mg/$m^2$ |
| Sodium dihexyl-α-sulfosuccinate | 40 mg/$m^2$ |
| Sodium polystyrenesulfonate | 9 mg/$m^2$ |

| Surface backing layer | |
|---|---|
| Gelatin ($Ca^{2+}$ content: 30 ppm) | 3.6 g/$m^2$ |
| Compound (6) | 3 mg/$m^2$ |
| Polymethyl methacrylate particles | 50 mg/$m^2$ |
| (average particle size: 4.7 μm) | |
| Compound (7) | 40 mg/$m^2$ |
| Compound (8) | 40 mg/$m^2$ |
| Compound (9) | 80 mg/$m^2$ |
| Sodium dodecylbenzenesulfonate | 75 mg/$m^2$ |
| Sodium dihexyl-α-sulfosuccinate | 20 mg/$m^2$ |
| Compound (10) | 5 mg/$m^2$ |
| N-perfluorooxtanesulfonyl-N-propylglycine potassium | 7 mg/$m^2$ |
| Sodium sulfate | 50 mg/$m^2$ |
| Sodium acetate | 85 mg/$m^2$ |
| 1,2-Bis(vinylsulfonylacetamide) ethane | 150 mg/$m^2$ |

Compound (6)

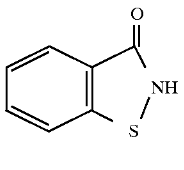

-continued

Compound (7)

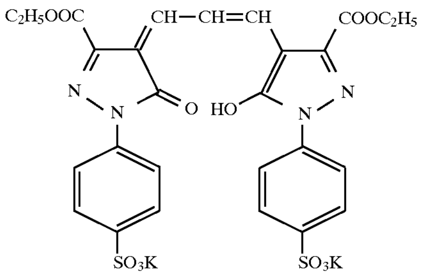

Compound (8)

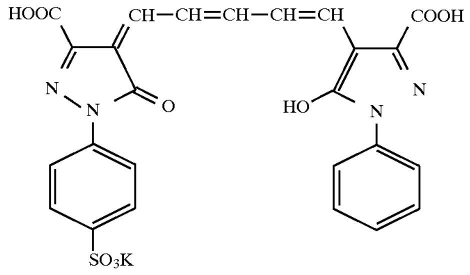

Compound (9)

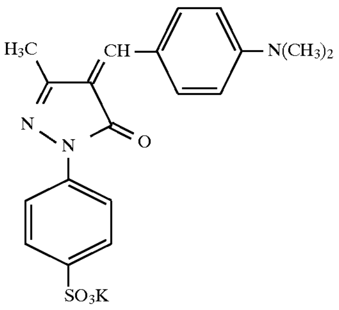

Compound (10)

$C_8F_{17}SO_3Li$ (4-2) Formation of the photographic layers

On the surface of the support, the emulsion layer and the lower and upper protective layers were simultaneously coated.

| Solution (I) | |
|---|---|
| Water | 1,000 ml |
| Gelatin | 20 g |
| Sodium chloride | 20 g |
| 1,3-Dimethylimidazolidine-2-thione | 20 mg |
| Sodium benzenesulfonate | 6 mg |

| Solution (II) | |
|---|---|
| Water | 400 ml |
| Silver nitrate | 100 g |

| Solution (III) | |
|---|---|
| Water | 400 ml |
| Sodium chloride | 30.5 g |
| Potassium bromide | 14 g |
| 0.001% Aqueous solution of potassium chloroiridium(III) acid | 15 mg |
| 0.001% Aqueous solution of ammonium hexabromoiridium(III) acid | 15 mg |

The solutions (II) and (III) were added to the solution (I) while stirring at 38° C. and pH of 4.5 for 10 minutes to form core grains of 0.16 μm. Further the following solutions (IV) and (V) were added to the core grains for 10 minutes. Furthermore, 0.15 g of potassium iodide was added to form grains.

| Solution (IV) | |
|---|---|
| Water | 400 ml |
| Silver nitrate | 100 g |

| Solution (V) | |
|---|---|
| Water | 400 ml |
| Sodium chloride | 30.5 g |
| Potassium bromide | 14 g |
| $K_4Fe(CN)_6$ | $1 \times 10^{-5}$ mol of silver |

The emulsion was washed with water according to a conventional flocculation method. Further, 40 g of gelatin was added to the emulsion.

The emulsion was adjusted to pH 5.3 and pAg 7.5. To the emulsion, 5.2 mg of sodium thiosulfate, 10.0 mg of chloroauric acid and 2.0 mg of N,N-dimethylselenourea were added. To the emulsion, 8 mg of sodium benzenesulfonate and 2.0 mg of sodium benzenesulfinate were further added. The emulsion was subjected to a chemical sensitization under the optimum conditions to prepare a cubic silver iodochlorobromide emulsion having the average grain size of 0.20 μm. The silver chloride content was 80 mol %.

To the emulsion, $5 \times 10^{-4}$ mol of the sensitizing dye (1) was added, and the emulsion was subjected to an ortho sensitization. Further, hydroquinone (2.5 g per 1 mol of silver), 1-phenyl-5-mercaptotetrazole (2.5 g per 1 mol of silver), colloidal silica (Snowtechs C, Nissan Chemical Co., Ltd., average particle size: 0.015 μm, 30 wt. % of gelatin), polyethyl acrylate latex of 0.05 μm (plasticizer, 40 wt. % of gelatin) and 1,1'-bis(vinylsulfonyl)methane (hardening agent, 180 mg/$m^2$) were added to the emulsion.

The coating amount of silver was 3.0 g/$m^2$, and the coating amount of gelatin was 1.5 g/$m^2$.

Sensitizing dye (1)

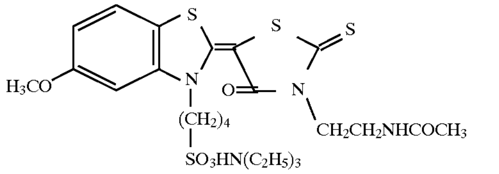

| (3-3) Lower protective layer | |
|---|---|
| Gelatin | 0.25 g/$m^2$ |
| Sodium benzenesulfonate | 4 mg/$m^2$ |
| 1-Hydroxy-2-benzaldoxime | 25 mg/$m^2$ |
| Polyethyl acrylate latex | 125 mg/$m^2$ |

| Upper protective layer | |
|---|---|
| Gelatin | 0.25 g/$m^2$ |
| Silica matting agent (average particle size 2.5 μm) | 50 mg/$m^2$ |
| Gelatin dispersion of the compound (1) | 30 mg/$m^2$ |
| Colloidal silica (Snowtechs C, Nissan Chemical Co., Ltd.) | 30 mg/$m^2$ |
| Compound (2) | 5 mg/$m^2$ |
| Sodium dodecylbenzenesulfonate | 10 mg/$m^2$ |

Compound (1)

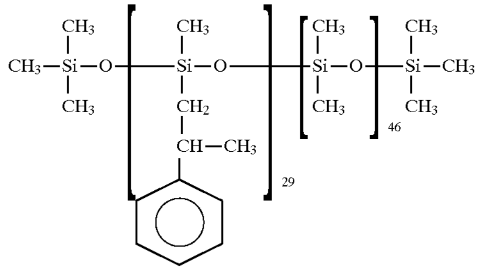

Compound (2)

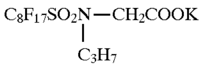

(4-4) Evaluation of the Photographic Material

The prepared photographic material was conditioned for 10 hours at 25° C. and at the relative humidity of 60%. Further, the photographic material was cut into pieces of samples at the same temperature and relative humidity. The samples were evaluated in the following manner.

(1) Dimensional stability

The samples were placed in an exposing machine at a high humidity (60% RH) or a low humidity (20% RH). In the machine, the samples were exposed to light. After 1 hour, the samples were exposed to light again. The change of the distance between two exposed points (the length of a side along the latitudinal direction, a diagonal line and a side along the longitudinal direction in a square) were measured after the samples were developed according to a conventional process.

(2) Sharpness of image

The samples were exposed to light through a dotted image, and were developed according to a conventional process.

Then, number of the overlapping dots was counted in the obtained image.

(3) Adhesion between the undercoating layer and the emulsion layer

The surface of the sample was cut by a razor (5 mm square). An adhesive tape was placed on the sample, and the tape was immediately peeled from the sample along the direction of 180 degree. The number of the peeled area was counted. The results are classified into the following three grades.

A: 5% or less

B: 5 to 10%

C: 10% or more

The results are set forth in Table 2.

TABLE 2

| Sample No. | Polymer | Dimensional stability (A) | (B) | (C) | (D) | Sharpness | Adhesion |
|---|---|---|---|---|---|---|---|
| 1-1 | SPS-1 | 20 μm | 25 μm | 42 μm | 49 μm | 0 | A |
| 1-2 | SPS-1 | 150 μm | 185 μm | 300 μm | 350 μm | 36 | A |
| 1-3 | SPS-1 | 45 μm | 50 μm | 82 μm | 91 μm | 0 | A |
| 1-4 | SPS-1 | 16 μm | 20 μm | 30 μm | 35 μm | 0 | B |
| 1-5 | SPS-1 | 15 μm | 21 μm | 32 μm | 34 μm | 0 | C |
| 1-6 | SPS-1 | 40 μm | 42 μm | 82 μm | 90 μm | 0 | A |
| 1-7 | SPS-1 | 85 μm | 90 μm | 175 μm | 190 μm | 8 | A |
| 1-8 | SPS-1 | 45 μm | 48 μm | 90 μm | 96 μm | 0 | A |
| 1-9 | SPS-1 | 32 μm | 35 μm | 62 μm | 72 μm | 0 | A |
| 1-10 | SPS-1 | 38 μm | 39 μm | 82 μm | 86 μm | 0 | A |
| 1-11 | SPS-1 | 48 μm | 50 μm | 88 μm | 90 μm | 0 | A |
| 1-12 | 2 + 3 | 22 μm | 27 μm | 46 μm | 52 μm | 0 | A |
| 1-13 | 2 + 3 | 165 μm | 190 μm | 335 μm | 375 μm | 42 | A |
| 1-14 | 2 + 3 | 48 μm | 52 μm | 85 μm | 90 μm | 0 | A |
| 1-15 | 2 + 3 | 19 μm | 23 μm | 33 μm | 38 μm | 0 | B |
| 1-16 | 2 + 3 | 18 μm | 22 μm | 35 μm | 36 μm | 0 | C |
| 1-17 | 2 + 3 | 41 μm | 44 μm | 83 μm | 92 μm | 0 | A |
| 1-18 | 2 + 3 | 88 μm | 92 μm | 177 μm | 195 μm | 9 | A |
| 1-19 | 2 + 3 | 47 μm | 49 μm | 95 μm | 99 μm | 0 | A |
| 1-20 | 2 + 3 | 34 μm | 37 μm | 64 μm | 74 μm | 0 | A |
| 1-21 | 2 + 3 | 39 μm | 42 μm | 85 μm | 88 μm | 0 | A |
| 1-22 | 2 + 3 | 47 μm | 52 μm | 89 μm | 10 μm | 0 | A |
| 1-23 | SPS-2 | 20 μm | 24 μm | 44 μm | 48 μm | 0 | A |
| 1-24 | PET | 65 μm | 69 μm | 125 μm | 150 μm | 0 | A |

(Remark)
(A): The dimensional change of a latitudinal side of a square (250 mm) along the latitudinal direction
(B): The dimensional change of a diagonal line of the square along the latitudinal direction
(C): The dimensional change of a longitudinal side of a square (600 mm) along the latitudinal direction
(D): The dimensional change of a diagonal line of the square along the longitudinal direction

EXAMPLE 2

(1) Synthesis of Plastic Polymer

Syndiotactic styrenic polymers SPS-1, 2 and 3 were prepared in the same manner as in Example 1. Fine particles shown in Table 3 were added To the polymers.

(2) Formation of the Support

The above-prepared polymers were dried at 150° C. under reduced pressure to obtain crystallized pellets. The monomer content in the pellets was 900 to 1,100 ppm.

The pellets of the polymers SPS-1 and SPS-2 were placed in an extruding machine having a filter and T-die, and then extruded at 300° C. Further, a mixture of SPS-2 and SPS-3 (mixing ratio: 2/1) was placed in the extruding machine, and then extruded at 300° C. Before the extrusion, the polymers were filtered through a sintered metal filter. The T-die extruding machine was preheated at 320° C.

The melt was biaxially stretched while applying an electrostatic charge to the film. The stretching and heat setting conditions are set forth in Table 3.

TABLE 3

| Sample No. | Polymer | Thickness | Particles Size | Amount | Stretching (1) | (2) | (3) |
|---|---|---|---|---|---|---|---|
| 2-1 | SPS-1 | 175 μm | 0.2 μm | 60 μm | 28 cm | 3.7 | 4.0 |
| 2-2 | SPS-1 | 175 μm | 0.2 μm | 60 μm | 28 cm | 4.3 | 4.4 |
| 2-3 | SPS-1 | 175 μm | 0.2 μm | 60 μm | 28 cm | 2.7 | 2.7 |
| 2-4 | SPS-1 | 175 μm | 0.2 μm | 60 μm | 60 cm | 2.8 | 2.9 |
| 2-5 | SPS-1 | 175 μm | 0.2 μm | 60 μm | 60 cm | 3.7 | 4.0 |
| 2-6 | SPS-1 | 175 μm | None | — | 28 cm | 3.7 | 4.0 |
| 2-7 | SPS-1 | 175 μm | 5.1 | 350 μm | 28 cm | 3.7 | 4.0 |
| 2-8 | 2 + 3 | 175 μm | 0.2 μm | 60 μm | 28 cm | 3.7 | 4.0 |
| 2-9 | SPS-2 | 175 μm | 0.2 μm | 60 μm | 28 cm | 3.7 | 4.0 |
| 2-10 | SPS-1 | 175 μm | 0.2 μm | 60 μm | 28 cm | 3.7 | 4.0 |
| 2-11 | SPS-1 | 85 μm | 0.2 μm | 60 μm | 28 cm | 3.7 | 4.0 |
| 2-12 | SPS-1 | 100 μm | 0.2 μm | 60 μm | 28 cm | 3.7 | 4.0 |
| 2-13 | SPS-1 | 175 μm | 0.2 μm | 60 μm | 28 cm | 3.7 | 4.0 |
| 2-14 | SPS-1 | 175 μm | 0.2 μm | 60 μm | 28 cm | 3.7 × 1.3 | 4.0 |

(Remark)
(1): Distance between a heater and a roller at the longitudinal stretching shown in FIG. 2
(2): Longitudinal stretching rate (times)
(3): Latitudinal stretching rate (times)

Further, the film was subjected to a heat setting. The heating temperature was 230° C., except that the temperature for the samples Nos. 2–13 and 2–14 was 260° C. The heat setting was conducted while relaxing the film at the ratio of 8%, except that the samples Nos. 2–13 and 2–14 were not relaxed.

The physical properties of the films were measured. The results are set forth in Table 4.

TABLE 4

| No. | Young's modulus (4) | (5) | (6) | Dimensional change (7) | (8) | (9) | HFR | Haze |
|---|---|---|---|---|---|---|---|---|
| 2-1 | 190 | 160 | 18% | 0.3% | 0.4% | 0.1% | 0.049 | 0.4% |
| 2-2 | 330 | 310 | 7% | 0.9% | 1.4% | 0.5% | 0.018 | 5.9% |
| 2-3 | 41 | 45 | 12% | 0.2% | 0.3% | 0.2% | 0.059 | 2.2% |
| 2-4 | 52 | 54 | 11% | 0.3% | 0.4% | 0.2% | 0.072 | 2.1% |
| 2-5 | 180 | 130 | 32% | 0.2% | 0.7% | 0.9% | 0.055 | 0.7% |
| 2-6 | 200 | 170 | 16% | 0.2% | 0.3% | 0.2% | 0.045 | 0.1% |
| 2-7 | 240 | 190 | 17% | 0.3% | 0.2% | 0.2% | 0.042 | 2.6% |
| 2-8 | 150 | 130 | 14% | 0.3% | 0.7% | 0.5% | 0.042 | 0.7% |
| 2-9 | 210 | 150 | 32% | 0.3% | 0.7% | 0.5% | 0.037 | 1.8% |
| 2-10 | 190 | 160 | 18% | 0.3% | 0.4% | 0.1% | 0.049 | 0.4% |
| 2-11 | 180 | 160 | 11% | 0.3% | 0.4% | 0.2% | 0.046 | 0.2% |
| 2-12 | 185 | 160 | 9% | 0.3% | 0.3% | 0.1% | 0.048 | 0.1% |
| 2-13 | 200 | 180 | 15% | 0.7% | 0.7% | 0.3% | 0.052 | 0.3% |
| 2-14 | 230 | 200 | 19% | 0.5% | 0.5% | 0.5% | 0.035 | 0.5% |

(Remark)
(4): Young's modulus at 110° C. along a longitudinal direction
(5): Young's modulus at 110° C. along a latitudinal direction
(6): Difference between (4) and (5) per the larger value
(7): Dimensional change heated at 110° C. for 10 minutes along a longitudinal direction
(8): Dimensional change heated at 110° C. for 10 minutes along a latitudinal direction
(9): Difference between (7) and (8)
HFR: Heat flow rate (W/g)

(3) Surface Treatment of the Support

The supports were subjected to a glow charge treatment in the same manner as in Example 1.

(4) Formation of Undercoating Layer

The coating solution for an undercoating layer was coated on the treated surface of the support in the same manner as is Example 1. The support was then dried at 110° C. for 5 minutes while applying the tension of 12 kg/$m^2$ to the film.

The surface of the films were observed in the following manner. The results are set forth in Table 5.

(5) Formation of the Photographic Material

Photographic materials were prepared and evaluated in the same manner as in Example 1. The results are set forth in Table 5.

TABLE 5

| Sample | Surface conditions | | | | |
|---|---|---|---|---|---|
| No. | (e) | (f) | (g) | Stability | Sharpness |
| 2-1 | 0 | 0 mm | 0 | 15 μm | 0 |
| 2-2 | 8 | 8 mm | 42 | 88 μm | 25 |
| 2-3 | 10 | 9 mm | 0 | 96 μm | 33 |
| 2-4 | 12 | 9 mm | 0 | 93 μm | 38 |
| 2-5 | 1 | 2 mm | 4 | 65 μm | 0 |
| 2-6 | 0 | 0 mm | 3 | 23 μm | 0 |
| 2-7 | 0 | 0 mm | 0 | 18 μm | 0 |
| 2-8 | 1 | 2 mm | 0 | 60 μm | 0 |
| 2-9 | 1 | 2 mm | 0 | 51 μm | 0 |
| 2-10 | 0 | 0 mm | 0 | 15 μm | 0 |
| 2-11 | 1 | 3 mm | 0 | 45 μm | 0 |
| 2-12 | 0 | 0 mm | 0 | 20 μm | 0 |
| 2-13 | 3 | 5 mm | 5 | 55 μm | 0 |
| 2-14 | 10 | 8 mm | 25 | 85 μm | 22 |

(Remark)
(e): Number of creasing formed on the film (width: 30 cm, length: 1 m)
(f): The height of the waviness
(g): Number of hard spots formed in the film (area: 5 $cm^2$)

We claim:

1. A syndiotactic styrenic polymer film having a photographic material coated layer, wherein the film has a height of waviness not higher than 18 mm.

2. The syndiotactic styrenic polymer film as claimed in claim 1, wherein the film has a height of waviness of not higher than 12 mm.

3. The syndiotactic styrenic polymer film as claimed in claim 1, wherein the film has a Young's modulus in the range of 50 to 300 kg/$mm^2$ at 110° C. along a longitudinal direction and along a latitudinal direction.

4. The syndiotactic styrenic polymer film as claimed in claim 3, wherein the film shows a dimensional change of not more than 0.8% along a longitudinal direction and along a latitudinal direction after the film is heated at 110° C. for 10 minutes.

5. The syndiotactic styrenic polymer film as claimed in claim 3, wherein the difference between the Young's modulus along the longitudinal direction and that along the latitudinal direction is not more than 30% based on the larger value of the Young's moduli.

6. The syndiotactic styrenic polymer film as claimed in claim 4, wherein the difference between the dimensional change along the longitudinal direction and that along the latitudinal direction is not more than 0.6%.

7. The syndiotactic styrenic polymer film as claimed in claim 1, wherein the film has a haze of not more than 2%.

8. The syndiotactic styrenic polymer film as claimed in claim 1, wherein the film has such a heat flow rate that the difference between the rate at 90° C. and that at 115° C. is in the range of 0.02 to 0.07 W/g.

9. The syndiotactic styrenic polymer film as claimed in claim 1, wherein the film has a surface roughness in the range of 0.001 to 0.02 μm in terms of Ra.

10. The syndiotactic styrenic polymer film as claimed in claim 1, wherein the film has a thickness in the range of 90 to 300 μm.

11. The syndiotactic styrenic polymer film as claimed in claim 1, wherein the coated layer comprises gelatin.

12. The syndiotactic styrenic polymer film as claimed in claim 1, wherein the coated layer comprises a polyamide-epihalohydrin resin having a weight average molecular weight in the range of 5,000 to 10,000.

13. The syndiotactic styrenic polymer film as claimed in claim 1, wherein the coated layer has a thickness in the range of 0.02 to 10 μm.

14. A process for the preparation of a syndiotactic styrenic polymer film having a coated layer, said film having a height of waviness of not higher than 18 mm, wherein the process comprises the steps of:

coating a coating solution of the layer on the syndiotactic styrenic polymer film; and drying the film at 50° to 200° C. while conveying the film on rollers, said rollers being arranged at a distance in the range of 0.1 to 10 m.

15. The process as claimed in claim 14, wherein the film is conveyed on rollers while 3 to 200 cm of the film is in contact with each of the rollers.

16. The process as claimed in claim 14, wherein the film is conveyed on rollers while applying a tension of 2 to 40 kg/m to the film.

17. The process as claimed in claim 14, wherein the film is dried at 50° to 150° C.

18. The process as claimed in claim 17, wherein before coating the layer, the film is subjected to a glow discharge treatment under conditions that the content of water vapor in the air is not less than 10%.

19. The process as claimed in claim 18, wherein the before the glow discharge treatment, the film is heated at a temperature of 50° C. to the glass transition temperature of the syndiotactic styrenic polymer.

* * * * *